(12) United States Patent
Vidoni et al.

(10) Patent No.: US 12,316,207 B2
(45) Date of Patent: May 27, 2025

(54) DUAL OUTPUT DC-DC BOOST CONVERTER WITH REDUCED OUTPUT LEAKAGE

(71) Applicant: STMicroelectronics S.r.l., Agrate Brianza (IT)

(72) Inventors: Aldo Vidoni, Rho (IT); Andrea Barbieri, Casalpusterlengo (IT); Franco Consiglieri, Piacenza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 783 days.

(21) Appl. No.: 17/560,977

(22) Filed: Dec. 23, 2021

(65) Prior Publication Data

US 2023/0208294 A1  Jun. 29, 2023

(51) Int. Cl.
*H02M 1/00* (2007.01)
*H02M 3/158* (2006.01)

(52) U.S. Cl.
CPC ......... *H02M 1/009* (2021.05); *H02M 1/0038* (2021.05); *H02M 3/158* (2013.01); *H02M 1/0043* (2021.05)

(58) Field of Classification Search
CPC .. H02M 1/0038; H02M 1/0043; H02M 1/008; H02M 1/009; H02M 3/156; H02M 3/158; H02J 1/082
See application file for complete search history.

(56) References Cited

U.S. PATENT DOCUMENTS

| | | | |
|---|---|---|---|
| 6,952,355 B2 | 10/2005 | Riggio et al. | |
| 7,948,720 B2 | 5/2011 | Mok et al. | |
| 8,847,564 B2 | 9/2014 | Williams | |
| 9,407,156 B2 | 8/2016 | Nussbaum et al. | |
| 9,685,502 B2 | 6/2017 | Wood | |
| 10,651,748 B2 | 5/2020 | Jitaru | |
| 11,121,541 B2 | 9/2021 | de Marco et al. | |
| 2006/0012348 A1 | 1/2006 | Zhao et al. | |

(Continued)

FOREIGN PATENT DOCUMENTS

| EP | 3432454 A1 | 1/2019 |
|---|---|---|
| WO | 2019005043 A1 | 1/2019 |

OTHER PUBLICATIONS

Kumar, Ashok, et al: "Analysis and Design of a Current Fed Non-Isolated Buck-Boost DC-DC Converter," 2016, IEEE, 8 pages.

(Continued)

*Primary Examiner* — Fred E Finch, III
(74) *Attorney, Agent, or Firm* — Crowe & Dunlevy LLC

(57) ABSTRACT

A DC-DC boost converter includes an inductor coupled between an input voltage and an input node, a first path coupled between the input node and a first output node at which a first output voltage is generated, and a second path coupled between the input node and a second output node at which a second output voltage is generated. The DC-DC boost converter operates in a first operating phase where the first path boosts the first output voltage and where the second path is kept from boosting the second output voltage by the second path being coupled to the first path, and operates in a second operating phase where the second path boosts the second output voltage and where the first path is kept from boosting the first output voltage by the second path not being coupled to the first path.

25 Claims, 3 Drawing Sheets

(56) References Cited

U.S. PATENT DOCUMENTS

| | | |
|---|---|---|
| 2007/0170897 A1 | 7/2007 | Williams |
| 2008/0122291 A1* | 5/2008 | Uchimoto ............ H02M 3/1584 307/31 |
| 2015/0077082 A1 | 3/2015 | Kilic |
| 2017/0237346 A1* | 8/2017 | Toyama ................ H02M 3/157 323/271 |
| 2020/0253520 A1 | 8/2020 | Wang et al. |
| 2021/0203179 A1 | 7/2021 | Gambetta et al. |

OTHER PUBLICATIONS

Ranjana, Mahajan Sagar Bhaskar, et al: "Non-Isolated Dual Output Hybrid DC-DC Multilevel Converter for Photovoltaic Applications," 2014 2nd International Conference on Devices, Circuits and Systems (ICDCS), 6 pages.

European Search Report and Written Opinion for counterpart EP Appl. No. 22211223.7, report dated Apr. 28, 2023, 11 pgs.

* cited by examiner

DUAL OUTPUT DC-DC BOOST CONVERTER WITH REDUCED OUTPUT LEAKAGE

TECHNICAL FIELD

This disclosure is directed to the field of DC-DC boost converters and, in particular, to a dual output DC-DC boost converter utilizing clamping between output lines so as to reduce output leakage.

BACKGROUND

DC-DC boost converters are utilized to step up an input voltage (while stepping down an input current) to produce a high voltage output. One of many uses for DC-DC boost converters is in the driving of piezoelectrically actuated micro-electromechanical systems (MEMS) mirror devices. Devices incorporating MEMS mirror devices may utilize two such MEMS mirror devices to scan an incident light beam in a desired two-dimensional scan pattern across a target area.

A sample known DC-DC boost converter 1 used in a system for driving a pair of MEMS mirror devices (e.g., a pair of MEMS mirror devices working at a same frequency or different frequencies) is shown in FIG. 1. The DC-DC boost converter 1 receives an input voltage Vin through an input inductor L, the input inductor L being connected to node Nn, at which a voltage SW is produced during operation. A first diode D1 is connected between node Nn and a first output capacitor C1 across which a first boosted output voltage VBOOSTL is produced. A first switch S1 is connected between node Nn and ground. The first switch S1 is operated by a drive main control signal Drive_Main_SW. A second diode D2 is connected between node Nn and a second output capacitor C2 by a switch S2 (e.g., NMOS transistor). A second boosted output voltage VBOOSTR (for, for example, may be lower than the first boosted output voltage VBOOSTL) is produced across the second output capacitor C2. The NMOS transistor S2 is operated by a drive line control signal Drive_Line_SW.

Operation is now described with additional reference to FIG. 2, where the circuit 1 alternates between phases in which the voltage VBOOSTL is boosted and in which the voltage VBOOSTR is boosted. At the start of the VBOOSTL phase, as can be seen in FIG. 2, the switch control signal Drive_Main_SW is asserted to close switch S1 to thereby connect node Nn to ground.

When the switch control signal Drive_Main_SW is deasserted to open switch S1, a boosted voltage SW is produced at node Nn, as can be seen in FIG. 2. As a result, current is delivered to charge capacitor C1, increasing the voltage VBOOSTL stored on capacitor C1. This is the intention during the VBOOSTL phase.

At the start of the VBOOSTR phase, the switch control signal Drive_Main_SW is asserted to close switch S1 to thereby connect node Nn to ground. The drive line control signal Drive_Line_SW is kept asserted throughout the VBOOSTR phase. When the switch control signal Drive_Main_SW is asserted to open switch S1, a boosted voltage SW is produced at node Nn, as can be seen in FIG. 2. As a result, current is delivered to charge capacitor C2, increasing the voltage VBOOSTR stored on capacitor C2.

A problem arises that in the VBOOSTL phase, the gate of the NMOS transistor S2 ends up being coupled to the voltage SW through a parasitic capacitance across the junction of diode D2, and through the parasitic drain-gate capacitance in the NMOS transistor S2. As a result, the voltage Vline at the cathode of diode D2 also rises as the voltage SW rises. This increases the voltage as seen by the gate of S2 independent of the drive line control signal Drive_Line_SW, resulting in S2 weakly turning on and current flowing into capacitor C2 to thereby increase the voltage VBOOSTR. This is undesirable, because current flowing into capacitor C2 reduces current flowing into capacitor C1, and the VBOOSTL phase is intended to charge capacitor C1 to boost VBOOSTL.

A way to address this would be to add a second NMOS transistor in series with S2, since the current through S2 from its parasitic drain-gate capacitance charging will be insufficient to charge the parasitic drain-gate capacitance of the added NMOS transistor. However, this increases complexity of the system, increases the resistance of the path between diode D2 and capacitor C2 during the VBOOSTR phase when the NMOS transistors are turned on, and increases area consumption. Therefore, further development into DC-DC boost converters is needed.

SUMMARY

Disclosed herein is a device comprising a DC-DC boost converter. The DC-DC boost converter includes an inductor coupled between an input voltage and an input node, a first path coupled between the input node and a first output node at which a first output voltage is generated, a second path coupled between the input node and a second output node at which a second output voltage is generated, and a first switch selectively coupling the second path to the first path in response to a first control signal. The DC-DC boost converter is configured to: operate in a first operating phase in which the first path boosts the first output voltage and in which the second path is kept from boosting the second output voltage by the first control signal being asserted to cause the first switch to couple the second path to the first path; and operate in a second operating phase in which the second path boosts the second output voltage and in which the first path is kept from boosting the first output voltage.

The first path may include a first diode having an anode coupled to the input node and a cathode coupled to the first output node, and a first capacitor coupled between the first output node and ground, wherein the first output voltage is generated across the first capacitor.

The second path may include a second diode having an anode coupled to the input node and a cathode coupled to an intermediate node, a second switch coupled between the intermediate node and the second output node, the second switch being controlled by a second control signal, and a second capacitor coupled between the second output node and ground, wherein the second output voltage is generated across the second capacitor. The first switch may selectively couple the intermediate node to the cathode of the first diode in the first operating phase, and the second control signal may be asserted to cause the second switch to selectively couple the intermediate node to the second output node during the second operating phase.

An additional switch may be coupled between the input node and ground, the additional switch controlled by an additional control signal, with the additional control signal being asserted to close the additional switch during a first portion of the first operating phase and being deasserted to open the additional switch during a second portion of the first operating phase. Also, the additional control signal may be asserted to close the additional switch during a first portion of the second operating phase and is deasserted to open the additional switch during a second portion of the second operating phase.

The second switch may be an NMOS transistor having a drain coupled to the intermediate node, a source coupled to the second output node, and a gate coupled to receive the second control signal.

The first switch may be a PMOS transistor having a source coupled to the first output node, a drain coupled to the intermediate node, and a gate coupled to receive the first control signal.

A first feedback circuit may be coupled to the first output node, the first feedback circuit generating a first feedback voltage. A second feedback circuit may be coupled to the second output node, the second feedback circuit generating a second feedback voltage. A controller may be configured to generate the first and second control signals based upon the first and second feedback voltages.

First drive circuitry may be powered by the first output voltage, and a first micromirror may be driven by the first drive circuitry. Second drive circuitry may be powered by the second output voltage, and a second micromirror may be driven by the second drive circuitry.

Also disclosed herein is a DC-DC boost converter including a first diode coupled between an input node and a first output node, wherein a first capacitor is coupled between the first output node and ground such that a first output voltage is generated across the first capacitor. The DC-DC boost converter also includes a first switch coupled between the input node and ground, the first switch operated by a first control signal, a second diode coupled between the input node and an intermediate node, a second switch coupled between the intermediate node and a second output node, the second switch operated by a second control signal, wherein a second capacitor is coupled between the output node and ground such that a second output voltage is generated across the second capacitor. A third switch is coupled between the intermediate node and the first output node, the third switch operated by a third control signal. A controller is configured to generate the first, second, and third control signals so as to: in a first operating phase, close the first switch during a first portion of the first operating phase and open the first switch during a second portion of the first operating phase, open the second switch during the first operating phase, and close the third switch during the first operating phase; and in a second operating phase, close the first switch during a first portion of the second operating phase and open the first switch during a second portion of the second operating phase, close the second switch during the second operating phase, and open the third switch during the second operating phase.

The second switch may be an NMOS transistor having a drain coupled to the intermediate node, a source coupled to the second output node, and a gate coupled to receive the second control signal.

The third switch may be a PMOS transistor having a source coupled to the first output node, a drain coupled to the intermediate node, and a gate coupled to receive the third control signal.

A first feedback circuit may be coupled to the first output node, the first feedback circuit generating a first feedback voltage. A second feedback circuit may be coupled to the second output node, the second feedback circuit generating a second feedback voltage. The controller may be configured to generate the first, second, and third control signals based upon the first and second feedback voltages.

A method described herein includes operating a DC-DC boost controller in a first operating phase in which a first path boosts an input voltage to produce a first output voltage and in which a second path is kept from boosting a second output voltage by clamping the second path to the first path, and operating the DC-DC boost controller in a second operating phase in which the second path boosts the second output voltage and in which the first path is kept from boosting the first output voltage, wherein the second path is not clamped to the first path during the second operating phase.

The method also includes, in the first operating phase, charging an inductor coupled to the input voltage during a first portion of the first operating phase and permitting the inductor to discharge during a second portion of the first operating phase.

The method also includes, in the second operating phase, charging the inductor during a first portion of the second operating phase and permitting the inductor to discharge during a second portion of the second operating phase.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic. Moreover, any described inductor or inductance is a discrete device unless the contrary is stated, and is not a parasitic.

Figure 1:
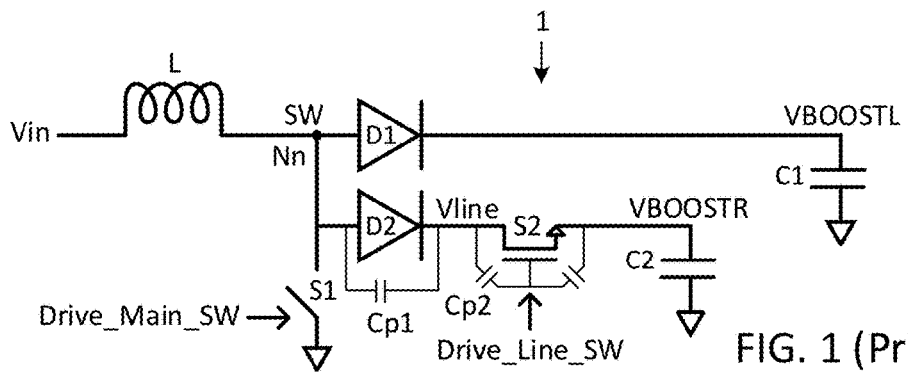
FIG. 1 is a schematic diagram of a prior art DC-DC boost converter.
Figure 2:
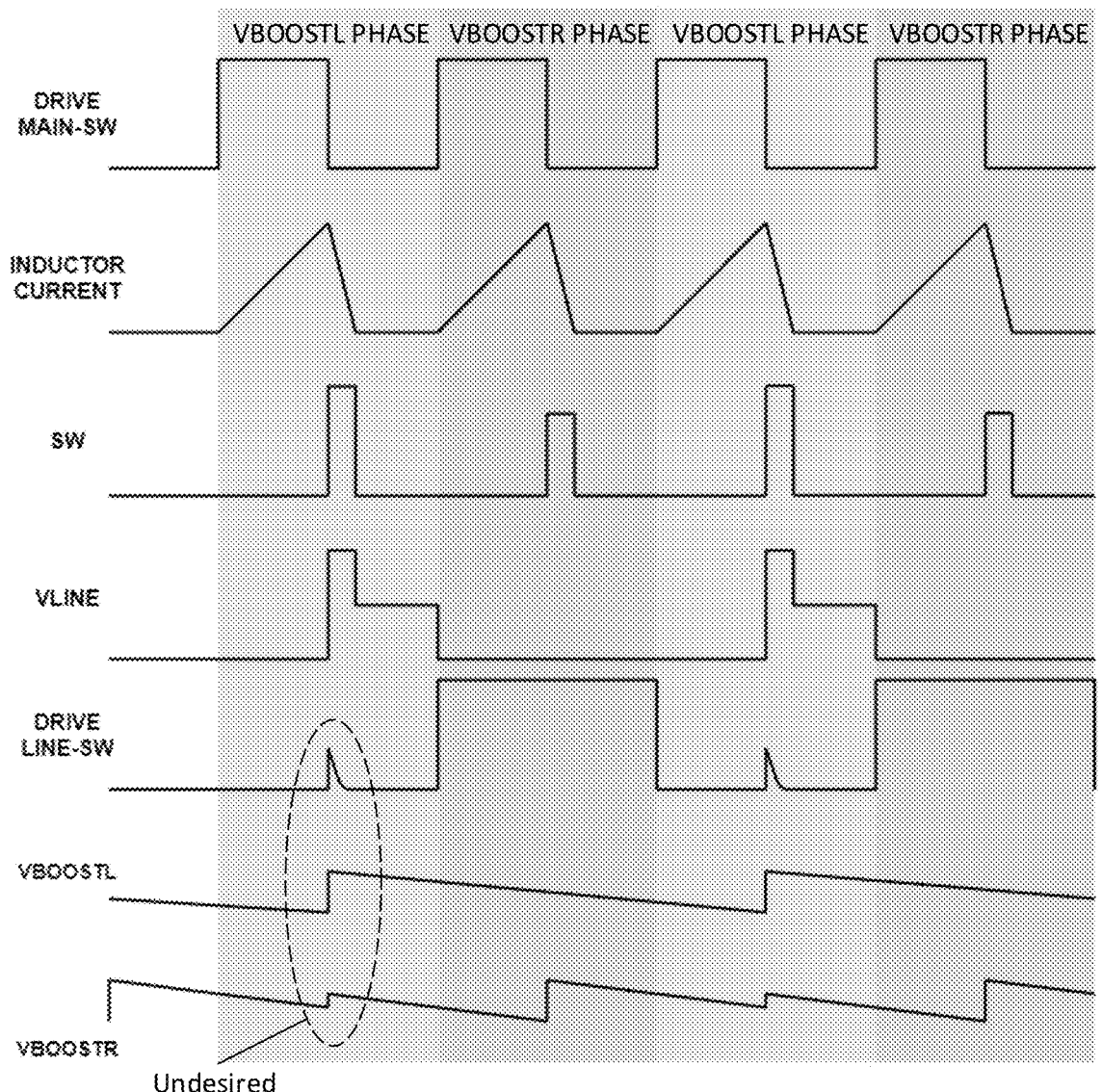
FIG. 2 is a graph showing signals of the DC-DC boost converter of FIG. 1 in operation.
Figure 3:
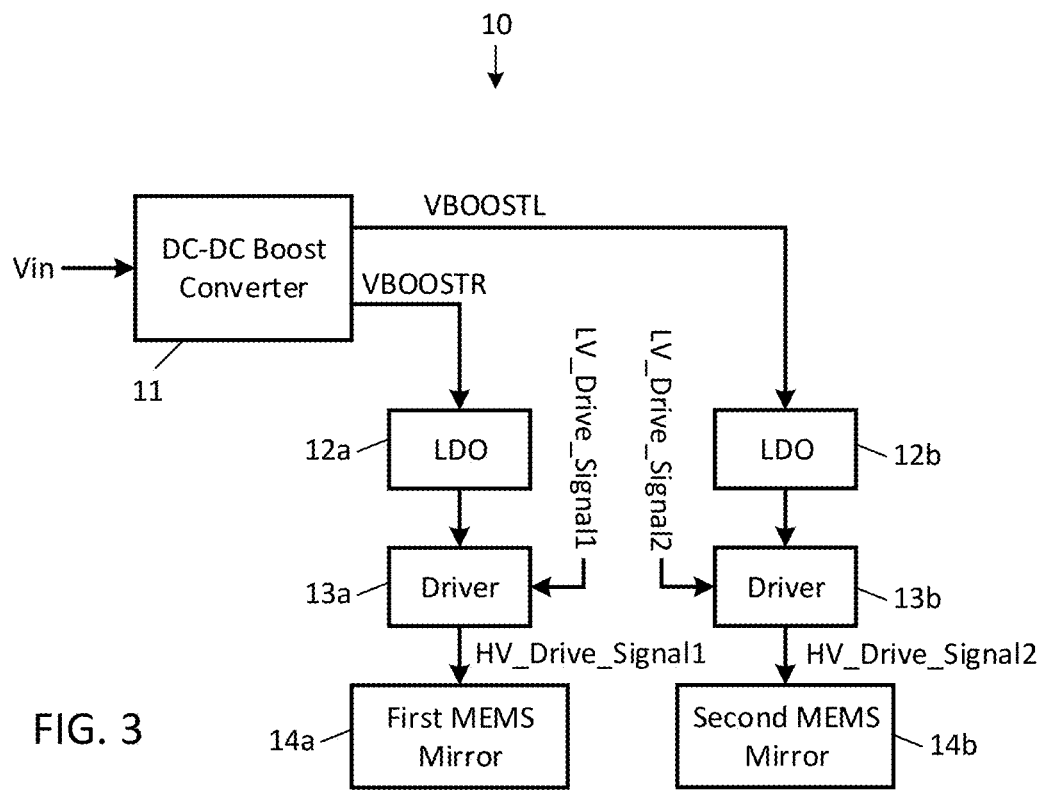
FIG. 3 a block diagram of a driving system for a pair of MEMS mirror devices, disclosed herein.

A driving system 10 for a pair of MEMS mirror devices 14 (e.g., a first MEMS mirror 14a and a second MEMS mirror 14b operated at the same or a different frequency) is shown in FIG. 3. The driving system 10 may be incorporated within a picoprojector, headset, or depth sensing system.

The driving system 10 includes a DC-DC boost converter 11 receiving an input voltage Vin and boosting that input voltage to produce two output voltages VBOOSTL and VBOOSTR. Vin may be on the order of 3.3V, while VBOOSTL may be on the order of 19V to 45V, and VBOOSTR may be on the order of 14V to 40V. The voltage VBOOSTR is fed as input to a low dropout (LDO) voltage regulator 12a, which provides output supply voltage to driver circuitry 13a. The driver circuitry 13a, using a power supply voltage produced by the LDO voltage regulator 12a and under control of a low voltage drive control signal LV_Drive_Signal1, generates a high voltage drive signal HV_Drive_Signal1 used to drive the MEMS mirror 14a (for example, at resonance). The voltage VBOOSTL is fed as input to a low dropout (LDO) voltage regulator 12b, which provides output supply voltage to driver circuitry 13b. The driver circuitry 13b, using a power supply voltage produced by the LDO voltage regulator 12b and under control of a low voltage drive control signal LV_Drive_Signal2, generates a high voltage drive signal HV_Drive_Signal2 used to drive the MEMS mirror 14b (for example, in a linear fashion).

Figure 4:
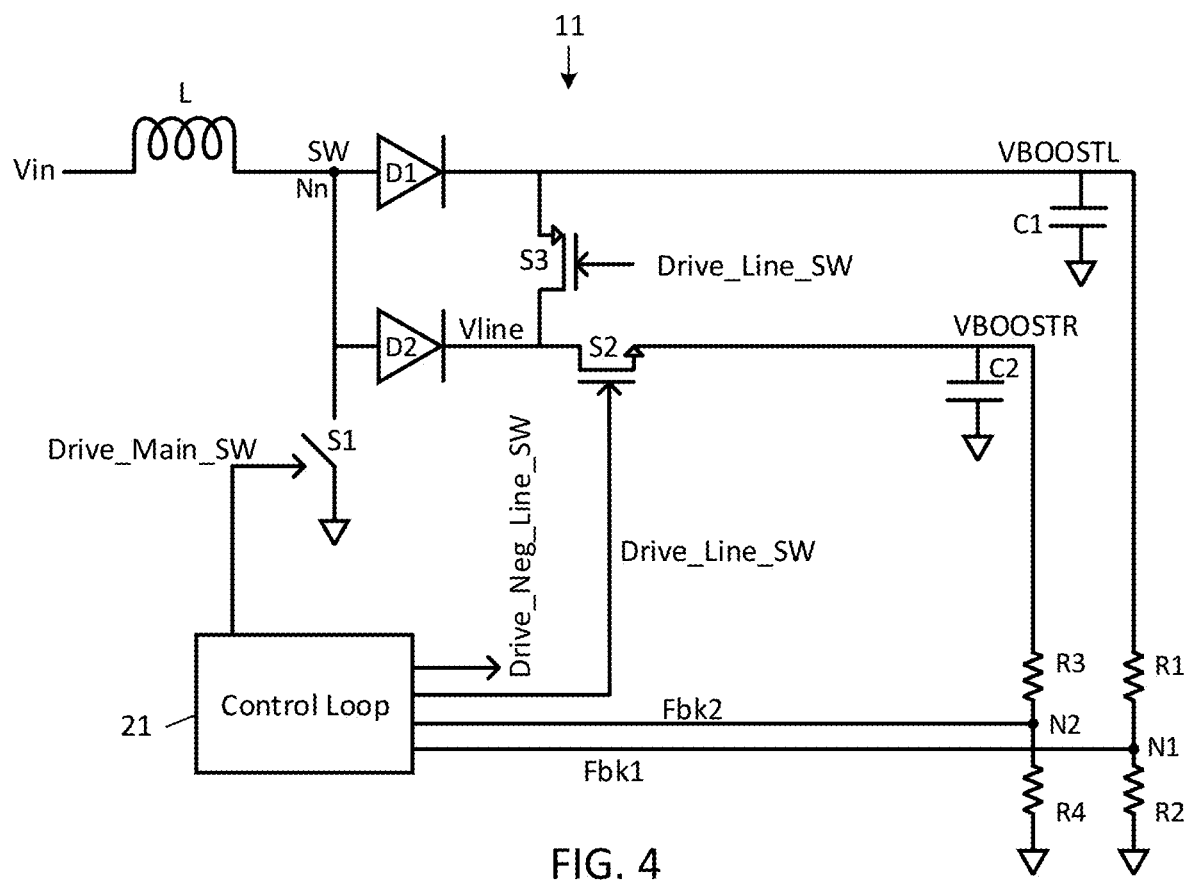
FIG. 4 is a schematic block diagram of the DC-DC boost converter of FIG. 3.

The DC-DC boost converter 11 is now described with reference to FIG. 4. The DC-DC boost converter 11 receives an input voltage Vin through an input inductor L, the input inductor L being connected to node Nn at which a voltage SW is produced during operation. A first diode D1 has its anode connected to node Nn and its cathode connected to a first terminal of a first output capacitor C1 across which a first boosted output voltage VBOOSTL is produced. A second terminal of the first output capacitor C1 is connected to ground. The first terminal of the first output capacitor C1 is coupled to ground through series connected resistors R1 and R2, with a node N1 being a tap between the resistors R1 and R2. A first feedback voltage Fbk1 is produced at node N1.

A first switch S1 is connected between node Nn and ground. The first switch S1 may be a transistor, such an NMOS transistor, and is operated by a drive main control signal Drive_Main_SW.

A second diode D2 has its anode connected to node Nn and its cathode connected to a drain of a second switch S2 (e.g., an NMOS transistor). The NMOS transistor S2 has its source connected to a first terminal of a second output capacitor C2, and has its gate connected to a drive line control signal Drive_Line_SW. A second terminal of the second output capacitor C2 is connected to ground. A second boosted output voltage VBOOSTR is produced across the second output capacitor C2. The first terminal of the second output capacitor C2 is coupled to ground through series connected resistors R3 and R4, with a node N2 being a tap between the resistors R3 and R4. A second feedback voltage Fbk2 is produced at node N2.

A third switch S3 (e.g., a PMOS transistor) has its source connected to the first terminal of the first output capacitor C1, its drain connected to the cathode of the diode D2 and drain of NMOS transistor S2, and its gate connected to Drive_Line_SW. As an alternative, S3 could be an NMOS transistor having its drain connected to the first terminal of the first output capacitor C1, its source connected to the cathode of the diode D2 and the drain of NMOS transistor S2, and its gate connected to Drive_Neg_Line_SW, with Drive_Neg_Line in this instance being a logical invert of Drive_Line_SW. A control loop circuit 21 has inputs connected to nodes N1 and N2 to thereby receive the feedback voltages Fbk1 and FBk2 as input. The control loop circuit 21 has outputs generating the drive main control signal Drive_Main_SW and the drive line switch control signal Drive_Line_SW. The control loop circuit 21 generates its outputs based upon its inputs so as to produce the desired VBOOSTL and VBOOSTR voltages.

Figure 5:
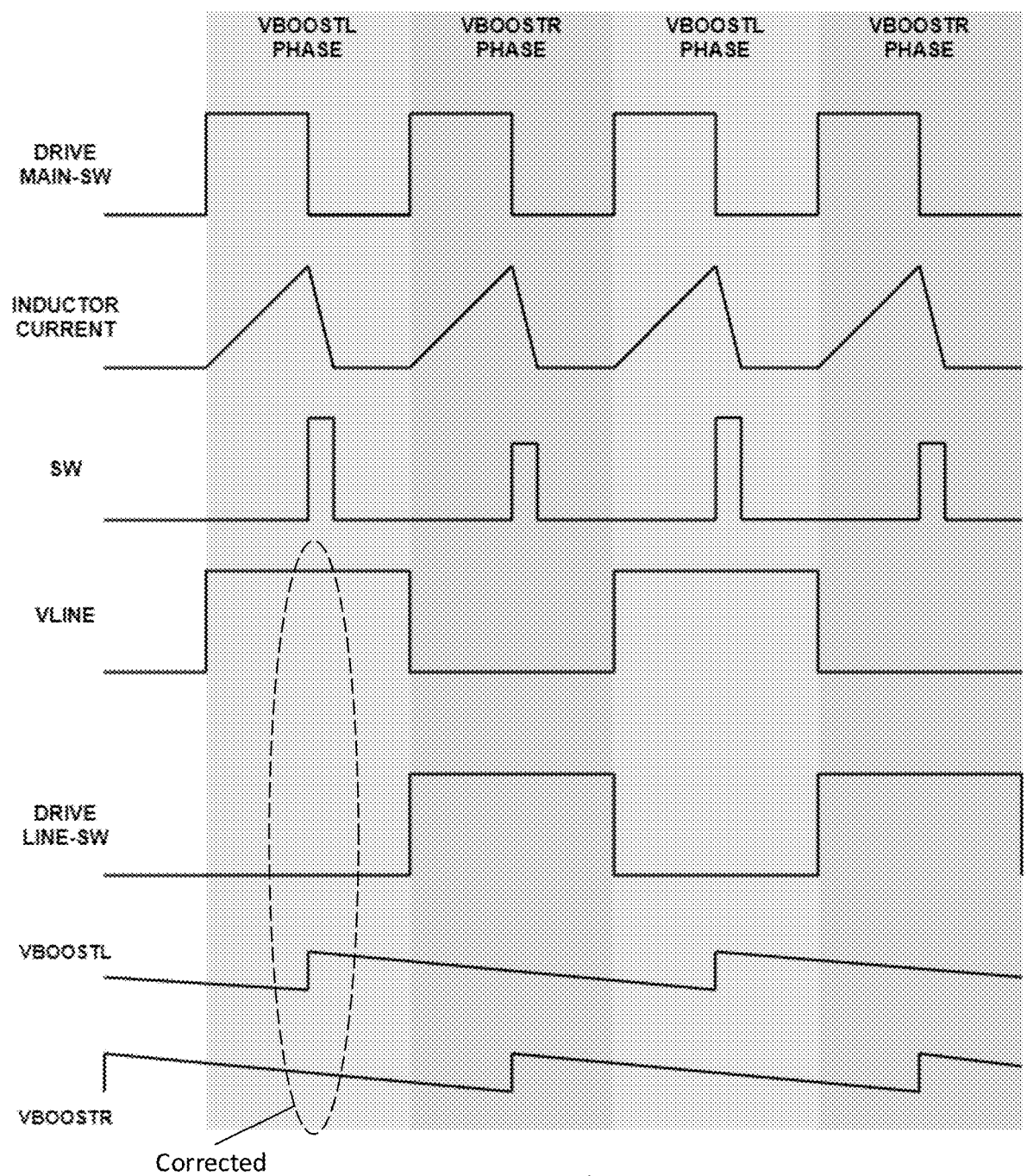
FIG. 5 is a graph showing signals of the DC-DC boost converter of FIG. 4 in operation.

Operation is now described with additional reference to FIG. 5, where the circuit 11 alternates between phases in which the voltage VBOOSTL is boosted and in which the voltage VBOOSTR is boosted. At the start of the VBOOSTL phase, as can be seen in FIG. 5, Drive_Main_SW is asserted to close switch S1 to thereby connect node Nn to ground, with the result being that the current through the inductor L ramps upwardly as shown, generating a magnetic field and thereby storing energy in the inductor L. When Drive_Main_SW is deasserted to open switch S1, the current into the inductor L falls as can be seen, and the strength of the magnetic field collapses as the stored energy is converted to current to attempt to maintain the current output from the inductor L. As a result, the left side of the inductor L goes positive, meaning that the voltage across the inductor L is in series with the input voltage Vin, thereby providing a boosted voltage SW at the right side of the inductor L (node Nin). The rise in this voltage SW during the VBOOSTL phase when the switch S1 opens can be seen in FIG. 5. The rise in the voltage SW causes diode D1 to become forward biased (because VBOOSTL has ramped downward sufficiently) and conduct a forward current, and therefore current is sourced to charge capacitor C1, increasing the voltage VBOOSTL stored on capacitor C1.

The drive line switch control signal Drive_Line_SW is deasserted during the VBOOSTL phase. As a result, the NMOS transistor S2 is intended to remain off, while the PMOS transistor S3 is turned on. Turning on of the transistor S3 serves to clamp the drain of the NMOS transistor S2 (and therefore the voltage Vline) to VBOOSTL during the VBOOSTL phase, which has the result of preventing the diode D2 from becoming forward biased and prevents the coupling of the voltage SW to the gate of NMOS transistor S2 through the parasitic drain-gate capacitance of S2, keeping NMOS transistor S2 off.

Therefore, notice that in FIG. 5, the voltage Vline remains asserted during the entire VBOOSTL phase, that the drive line switch control signal Drive_Line_SW remains deasserted during the entire VBOOSTL phase, and that VBOOSTR is not boosted during the VBOOSTL phase. Thus, the clamping of the voltage Vline to the voltage VBOOSTL during the VBOOSTL phase eliminates the capacitive coupling of the voltage SW to the gate of the NMOS transistor S2 that occurred with the prior art. This also has the benefit of nearly eliminating concerns of leakage currents, which consume power. This also has the benefit of not increasing parasitic resistances, as happens with prior art designs.

At the start of the VBOOSTR phase, as can be seen in FIG. 5, Drive_Main_SW is asserted to close switch S1 to thereby connect node Nn to ground, with the result being that the current through the inductor L ramps upwardly as shown, generating a magnetic field and thereby storing energy in the inductor L. When Drive_Main_SW is deasserted to open switch S1, the current into the inductor L falls as can be seen, and the strength of the magnetic field collapses as the stored energy is converted to current to attempt to maintain the current output from the inductor L. As a result, the left side of the inductor L goes positive, meaning that the voltage across the inductor L is in series with the input voltage Vin, thereby providing a boosted voltage SW at the right side of the inductor L (node Nin). The rise in this voltage SW during the VBOOSTL phase when the switch S1 opens can be seen in FIG. 5. The rise in the voltage SW, however, does not cause the diode D1 to become forward biased because VBOOSTL has not yet fallen sufficiently for such condition to occur, and therefore VBOOSTL continues to ramp downward during the VBOOSTR phase.

The drive line control signal Drive_Line_SW is asserted during the VBOOSTR phase. As a result, the NMOS transistor S2 is turned on, and current is sourced to capacitor C2, boosting VBOOSTR during the VBOOSTR phase, as can be seen in FIG. 5. Since the diode D1 does not become forward biased, as stated, VBOOSTL is not boosted during the VBOOSTR phase.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A device comprising a DC-DC boost converter, wherein the DC-DC boost converter comprises:
   an inductor coupled between an input voltage and an input node;
   a first path coupled between the input node and a first output node at which a first output voltage is generated;
   a second path coupled between the input node and a second output node at which a second output voltage is generated; and
   a first switch selectively coupling the second path to the first path in response to a first control signal;
   wherein the DC-DC boost converter is configured to:
      operate in a first operating phase in which the first path boosts the first output voltage and in which the second path is kept from boosting the second output voltage by the first control signal being asserted to cause the first switch to couple the second path to the first path; and
      operate in a second operating phase in which the second path boosts the second output voltage and in which the first path is kept from boosting the first output voltage.

2. The device of claim 1, wherein the first path comprises:
   a first diode having an anode coupled to the input node and a cathode coupled to the first output node, and a first capacitor coupled between the first output node and ground, wherein the first output voltage is generated across the first capacitor.

3. The device of claim 2, wherein the second path comprises:
   a second diode having an anode coupled to the input node and a cathode coupled to an intermediate node;
   a second switch coupled between the intermediate node and the second output node, the second switch being controlled by a second control signal; and
   a second capacitor coupled between the second output node and ground, wherein the second output voltage is generated across the second capacitor;
   wherein the first switch selectively couples the intermediate node to the cathode of the first diode in the first operating phase; and
   wherein the second control signal is asserted to cause the second switch to selectively couple the intermediate node to the second output node during the second operating phase.

4. The device of claim 3, further comprising an additional switch coupled between the input node and ground, the additional switch controlled by an additional control signal, wherein the additional control signal is asserted to close the additional switch during a first portion of the first operating phase and is deasserted to open the additional switch during a second portion of the first operating phase, and wherein the additional control signal is asserted to close the additional switch during a first portion of the second operating phase and is deasserted to open the additional switch during a second portion of the second operating phase.

5. The device of claim 3, wherein the second switch comprises an NMOS transistor having a drain coupled to the intermediate node, a source coupled to the second output node, and a gate coupled to receive the second control signal.

6. The device of claim 5, wherein the first switch comprises a PMOS transistor having a source coupled to the first output node, a drain coupled to the intermediate node, and a gate coupled to receive the first control signal.

7. The device of claim 3, further comprising:
   a first feedback circuit coupled to the first output node, the first feedback circuit generating a first feedback voltage;
   a second feedback circuit coupled to the second output node, the second feedback circuit generating a second feedback voltage; and
   a controller configured to generate the first and second control signals based upon the first and second feedback voltages.

8. The device of claim 1, further comprising first drive circuitry powered by the first output voltage, and a first micromirror driven by the first drive circuitry; and second drive circuitry powered by the second output voltage, and a second micromirror driven by the second drive circuitry.

9. A DC-DC boost converter, comprising:
   a first diode coupled between an input node and a first output node, wherein a first capacitor is coupled between the first output node and ground such that a first output voltage is generated across the first capacitor;
   a first switch coupled between the input node and ground, the first switch operated by a first control signal;
   a second diode coupled between the input node and an intermediate node, a second switch coupled between the intermediate node and a second output node, the second switch operated by a second control signal, wherein a second capacitor is coupled between the output node and ground such that a second output voltage is generated across the second capacitor;
   a third switch coupled between the intermediate node and the first output node, the third switch operated by a third control signal; and
   a controller configured to generate the first, second, and third control signals so as to:
      in a first operating phase, close the first switch during a first portion of the first operating phase and open the first switch during a second portion of the first operating phase, open the second switch during the first operating phase, and close the third switch during the first operating phase; and
      in a second operating phase, close the first switch during a first portion of the second operating phase and open the first switch during a second portion of the second operating phase, close the second switch during the second operating phase, and open the third switch during the second operating phase.

10. The DC-DC boost converter of claim 9, wherein the second switch comprises an NMOS transistor having a drain coupled to the intermediate node, a source coupled to the second output node, and a gate coupled to receive the second control signal.

11. The DC-DC boost converter of claim 9, wherein the third switch comprises a PMOS transistor having a source coupled to the first output node, a drain coupled to the intermediate node, and a gate coupled to receive the third control signal.

12. The DC-DC boost converter of claim 9, further comprising:
a first feedback circuit coupled to the first output node, the first feedback circuit generating a first feedback voltage; and
a second feedback circuit coupled to the second output node, the second feedback circuit generating a second feedback voltage;
wherein the controller is configured to generate the first, second, and third control signals based upon the first and second feedback voltages.

13. A method, comprising:
operating a DC-DC boost controller in a first operating phase in which a first path boosts an input voltage to produce a first output voltage and in which a second path is kept from boosting a second output voltage by clamping the second path to the first path; and
operating the DC-DC boost controller in a second operating phase in which the second path boosts the second output voltage and in which the first path is kept from boosting the first output voltage, wherein the second path is not clamped to the first path during the second operating phase.

14. The method of claim 13, further comprising, in the first operating phase, charging an inductor coupled to the input voltage during a first portion of the first operating phase and permitting the inductor to discharge during a second portion of the first operating phase.

15. The method of claim 14, further comprising, in the second operating phase, charging the inductor during a first portion of the second operating phase and permitting the inductor to discharge during a second portion of the second operating phase.

16. The method of claim 13, wherein: the second path comprises a second diode having an anode coupled to an input node and a cathode coupled to an intermediate node, and a second switch coupled between the intermediate node and a second output node; clamping the second path to the first path comprises coupling the intermediate node to a cathode of a first diode in the first path via a first switch in response to a first control signal; and boosting the second output voltage comprises asserting a second control signal to cause the second switch to couple the intermediate node to the second output node during the second operating phase.

17. A DC-DC boost converter, comprising:
a first diode coupled between an input node and a first output node, wherein a first capacitor is coupled between the first output node and ground such that a first output voltage is generated across the first capacitor;
a first switch coupled between the input node and ground, the first switch operated by a first control signal;
a second diode coupled between the input node and an intermediate node, a second switch coupled between the intermediate node and a second output node, the second switch operated by a second control signal, wherein a second capacitor is coupled between the output node and ground such that a second output voltage is generated across the second capacitor;
a third switch coupled between the intermediate node and the first output node, the third switch operated by a third control signal; and
a controller configured to generate the first, second, and third control signals so as to:
in a first operating phase, close the first switch during a first portion of the first operating phase and open the first switch during a second portion of the first operating phase, open the second switch during the first operating phase, and close the third switch during the first operating phase; and
in a second operating phase, close the first switch during a first portion of the second operating phase and open the first switch during a second portion of the second operating phase, close the second switch during the second operating phase, and open the third switch during the second operating phase.

18. The DC-DC boost converter of claim 17, wherein the second switch comprises an NMOS transistor having a drain coupled to the intermediate node, a source coupled to the second output node, and a gate coupled to receive the second control signal.

19. The DC-DC boost converter of claim 17, wherein the third switch comprises a PMOS transistor having a source coupled to the first output node, a drain coupled to the intermediate node, and a gate coupled to receive the third control signal.

20. The DC-DC boost converter of claim 17, further comprising:
a first feedback circuit coupled to the first output node, the first feedback circuit generating a first feedback voltage; and
a second feedback circuit coupled to the second output node, the second feedback circuit generating a second feedback voltage;
wherein the controller is configured to generate the first, second, and third control signals based upon the first and second feedback voltages.

21. A device comprising a DC-DC boost converter, wherein the DC-DC boost converter comprises:
an inductor coupled between an input voltage and an input node;
a first path coupled between the input node and a first output node at which a first output voltage is generated;
a second path coupled between the input node and a second output node at which a second output voltage is generated, wherein the second path comprises:
a second diode having an anode coupled to the input node and a cathode coupled to an intermediate node, and a second switch coupled between the intermediate node and the second output node, the second switch being controlled by a second control signal; and
a first switch selectively coupling the second path to the first path in response to a first control signal, wherein the first switch selectively couples the intermediate node to the first path;
wherein the DC-DC boost converter is configured to:
operate in a first operating phase in which the first path boosts the first output voltage and in which the second path is kept from boosting the second output voltage by the first control signal being asserted to cause the first switch to couple the intermediate node to the first path; and
operate in a second operating phase in which the second path boosts the second output voltage and in which the first path is kept from boosting the first output voltage, wherein during the second operating phase, the second control signal is asserted to cause the second switch to selectively couple the intermediate node to the second output node.

22. The device of claim 21, further comprising an additional switch coupled between the input node and ground, the additional switch controlled by an additional control signal, wherein the additional control signal is asserted to close the additional switch during a first portion of the first operating phase and is deasserted to open the additional switch during a second portion of the first operating phase, and wherein the additional control signal is asserted to close the additional switch during a first portion of the second operating phase and is deasserted to open the additional switch during a second portion of the second operating phase.

23. The device of claim 21, wherein the second switch comprises an NMOS transistor having a drain coupled to the intermediate node, a source coupled to the second output node, and a gate coupled to receive the second control signal.

24. The device of claim 23, wherein the first switch comprises a PMOS transistor having a source coupled to the first output node, a drain coupled to the intermediate node, and a gate coupled to receive the first control signal.

25. The device of claim 21, further comprising:
a first feedback circuit coupled to the first output node, the first feedback circuit generating a first feedback voltage;
a second feedback circuit coupled to the second output node, the second feedback circuit generating a second feedback voltage; and
a controller configured to generate the first and second control signals based upon the first and second feedback voltages.

* * * * *